United States Patent
Kim

[15] 3,645,641
[45] Feb. 29, 1972

[54] COUNTERSINK

[72] Inventor: Jae Sun Kim, 538 Pine Avenue, Long Beach, Calif. 90812

[22] Filed: May 4, 1970

[21] Appl. No.: 34,342

[52] U.S. Cl. .................................................. 408/199, 408/207
[51] Int. Cl. ..................................................... B23b 51/10
[58] Field of Search ........................................ 408/199, 207

[56] References Cited

UNITED STATES PATENTS

| 2,442,554 | 6/1948 | Swiatek | 408/199 |
| 371,387 | 10/1887 | Smith | 408/199 |

FOREIGN PATENTS OR APPLICATIONS 373,245   12/1963   Switzerland ........................ 408/199

*Primary Examiner*—Francis S. Husar
*Attorney*—Fulwider, Patton, Rieber, Lee & Utecht

[57] ABSTRACT

A countersink for forming an annular chamfer around a circular hole. The countersink has a conical leading end which includes a cutout having a conical portion. The apex of the conical portion is coincident with the apex of the leading end to thereby form straight cutting and trailing edges. The cutting edge has a constant cutting angle along its length and the leading end is spirally ground.

8 Claims, 4 Drawing Figures

PATENTED FEB 29 1972 3,645,641

INVENTOR.
JAE SUN KIM

COUNTERSINK

This invention relates to a countersink for use in chamfering, countersinking, and other such operations.

Countersinks are tools which are used for forming an annular chamfer around a circular hole in metal and other materials. They often comprise a generally conical body portion having a plurality of longitudinal flutes forming cutting edges. As the countersink is rotated in the hole, the cutting edges remove material from the workpiece to produce the chamfer. Such countersinks tend to cut erratically because they are supported in the hole by their cutting edges, so that they tend to dig into the material and vibrate, producing irregular chamfers. Improved countersinks have been made which have a conical body with one flue which forms both a cutting edge and a trailing edge. Cutting edge clearance is provided around the conical body between the cutting edge and the trailing edge. This clearance is formed by grinding the conical body with a slight spiral, or lead, as illustrated and described in Swiatek, U.S. Pat. No. 2,422,554. The same grinding principle is shown in Bergstrom, U.S. Pat. No. 2,829,543 which shows a conical countersink having a cylindrical aperture through it with one edge of the aperture forming a cutting edge. While these improved countersinks reduce the vibration problem, then tend to have a limited range of use (i.e., a countersink of any given size provides optimum results with holes of diameters within a fairly narrow range), since the cutting angle varies over the length of the conical body.

The countersink of the present invention has a single flute which provides a substantially constant cutting angle so that the same tool can be used over a wide range of hole sizes.

In a preferred embodiment, the countersink comprises a generally conical leading end with a single cutout having a conical portion forming a cutting edge. The leading end is spirally ground to give a clearance for the cutting edge.

In drawings which illustrate a preferred embodiment of the invention:

Figure 1:
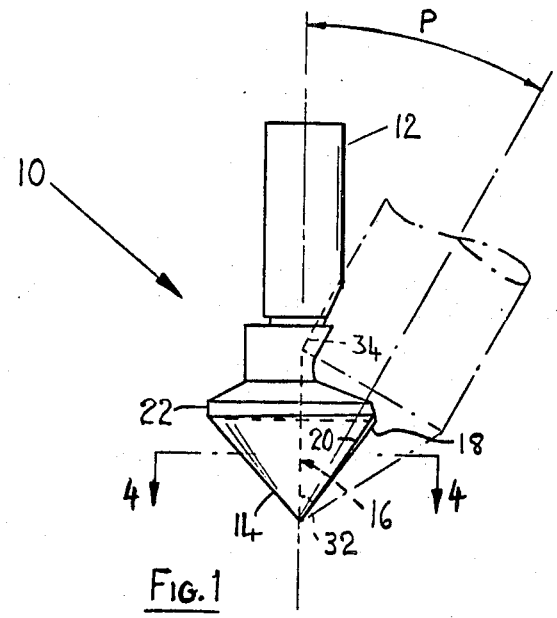
FIG. 1 is a side view of a countersink according to the invention.
Figure 2:
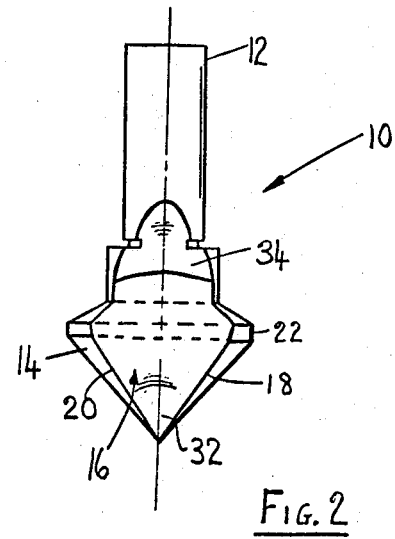
FIG. 2 is a front view of the countersink.
Figure 3:
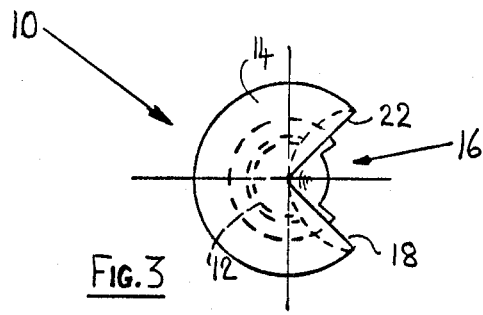
FIG. 3 is an axial view taken from the leading end of the countersink.

Reference is first made to FIGS. 1, 2, and 3 which show a countersink 10 having a conventional shank 12 for placing the countersink 10 in a chuck or the like and a generally conical leading end 14. A cutout forming a flute 16 is formed in the leading end 14, and its edges include a generally straight cutting and trailing edges 18 and 20, respectively, the cutting edge 18 angling upwardly and rearwardly with respect to the direction of rotation.

Figure 4:
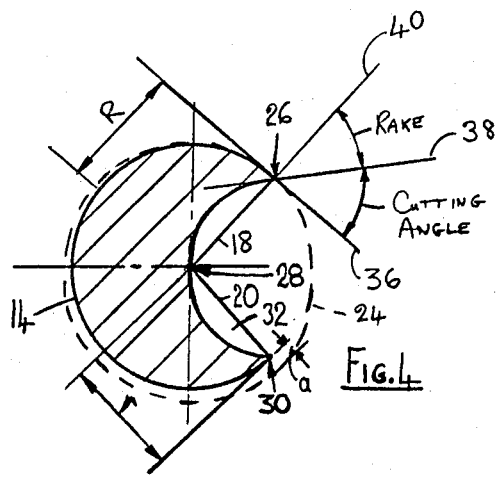
FIG. 4 is a sectional view on line 4—4 of FIG. 1.

Reference is next made to FIG. 2. The leading end 14 merges with a cylindrical portion 22 which forms a longitudinally reducing land created by spiral grinding of the leading end 14 in the manner described by Swiatek in the aforementioned patent. The spiral grinding provides a noncircular transverse cross section at any longitudinal point on the loading end such that the cutting edge 18 is always in position for cutting. FIG. 4 shows a typical cross section. The dotted line 24 indicates a true circle which would result if a cross section were taken through a true cone, and the solid outline shows the shape through the leading end 14. A point 26 on the cutting edge 18 is spaced from the countersink longitudinal axis 28 by a distance R whereas a similar point 30 on the trailing edge 20 is spaced from the axis 28 by a distance r. The distance R is greater than the distance r by an amount a which is the cutting clearance. This clearance a is distributed gradually around the circumference of the leading end 14 between the cutting edge point 26 and the trailing edge point 30 so that as the cutting edge 18 cuts a chamfer around a hole, the portion of the countersink in the hole is uniformly supported by the chamfer. This support results in smooth cutting with minimum vibration. The magnitude of the dimension a increases from the apex of the leading end 14 to its opposite end. For example, in a countersink having a maximum diameter of about 1 inch, the dimension a, which is small at the apex, increases to about 0.008 inch where the diameter of the leading end 14 is about 1 inch.

Reference is again made to FIG. 1. The cutout 16 comprises a conical portion 32 and a cylindrical portion 34 which can best be visualized by assuming that the cut out 16 is formed by a conical cutter having a cylindrical body as indicated in chain-dotted outline in FIG. 1. The apex of the conical portion 32 of the cutout 16 is coincident with the apex of the leading end 14 to give substantially straight cutting and trailing edges 18 and 20 respectively. The cutting edges 18 and 20 are substantially straight since cones which have coincident apices produce straight lines of interpenetration.

The size of the conical portion 32 relative to the leading end 14 is important since the leading edge 18 must always be capable of cutting. Referring now to FIG. 4, the angles normally used in describing a cutting edge are the cutting angle and the rake angle. The term cutting angle as used herein is an angle located in a transverse plane of the leading end 14 at right angles to the axis of the countersink, and it is defined as the acute angle between a tangent to the leading end 14 (line 36) and a tangent to the conical portion 32 of the cutout 16 (line 38) at any given point on the cutting edge (such as point 26). The term rake angle as used herein is an angle located in a transverse plane of the leading end 14 at right angles to the axis of the countersink, and is the acute angle between a tangent to the conical portion 32 of the cutout 16 (line 38) at any point (such as point 26) and a radial line (line 40) which passes through the same point (26).

For satisfactory cutting, the cutting angle should be less than 90°. Its exact size will depend on the type of material being chamfered. Typically, the cutting angle is in the range between about 45° to 70° for certain grades of soft material such as soft aluminum and annealed steel, and in the range of 70° to 80° for harder aluminum and harder steels. The rake angle is considered to be positive when the cutting angle is less than 90° as shown. If the cutting angle exceeds 90° the rake becomes negative. It is therefore important to have a positive rake angle for satisfactory cutting.

Since the countersink leading end 14 and the cutout portion 32 are both conical, the cutting and rake angles are substantially constant along the length of the cutting edge 18. Consequently the countersink can be used over a continuous range of sizes provided that the metals being cut all require approximately the same cutting angle.

In FIG. 1, the angle $p$ between the axis of the countersink 10 and the axis of the conical portion 32 of the cutout 16 is preferably about equal to the angle between the surface of the conical portion 32 of the cutout 16 and its axis so that the conical portion 32 includes in its surface part of the axis of the countersink 10. This angle $p$ gives a cutout with good clearance for the metal chips formed by cutting, and allows adequate space for applying cutting fluid to the cutting edge 18. However, the angle $p$ can be varied provided that the apex of the cutout conical portion is generally coincident with the apex of the countersink conical leading end, and provided that the cutout gives a cutting angle with a positive rake angle. Also, the cutout should not remove more than about 120° of a transverse section through the countersink conical end 14 (such as shown in FIG. 4) to ensure that the countersink is properly supported as it cuts. In operation, rotation of the countersink will cause the cutting edge 18 to bite into the metal being countersunk and the consequent metal chip will be directed inwardly and rearwardly into the flute 16 by the chip-deflecting surface which projects rearwardly and inwardly in such flute with respect to the cutting edge 18. It is important that the cutting edge 18 angle upwardly and rearwardly with respect to the direction of rotation rather than extending parallel to the axis of rotation to thereby give an angular attitude to the cutting edge to thereby improve the cutting action over a cutting edge that extends perpendicular to the direction of cut. The large capacity of the flute 16 provides an area for collection of a large quantity of chips and for placement of lubricating oils.

Also, it will be appreciated that the conical shape of the flute 16 produces a ratio of flute transverse cross section to the cross section of the leading extremity 14 that is nearly constant throughout the longitudinal length of such extremity to thereby maintain the favorable cutting angle and inclination of the cutting edge irrespective of the diameter of bore being countersunk.

From the foregoing it will be apparent that the countersink of present invention serves to reduce chatter and will cut different diameters without altering the r.p.m.'s thereof. Further, the countersink will serve to cut a wise range of holes with a single countersink. The metal chips are fed clear of the countersink and the countersink is relatively easy to resharpen.

Various modifications and changes may be made with regard to the foregoing detailed description without departing from the spirit of the invention.

I claim:

1. A countersink comprising:
   a body including a conical leading extremity having a longitudinal flute formed therein, said flute gradually increasing in cross section from the apex of said leading extremity to form at least 20 percent of the cross section of said leading extremity along the length thereof, said flute being formed to define a cutting edge on one side thereof that angles upwardly and rearwardly with respect to the direction of cutting rotation of said countersink whereby said cutting edge will cut into a work piece along an angle and said flute will provide a recess for receipt of a large quantity of chips and lubricant.

2. A countersink as set forth in claim 1 wherein:
   said flute is formed in cross section with a chip directing surface that curves inwardly and rearwardly with respect to the direction of cutting rotation of said countersink to form an acute cutting angle and to direct chips inwardly and away from said cutting edge.

3. A countersink as set forth in claim 1 wherein:
   said flute extends radially inwardly to the axis of said countersink throughout the length of said conical leading extremity.

4. A countersink as set forth in claim 1 wherein:
   the cross section of said flute forms at least 25 percent of the cross section of said leading extremity along the length of said leading extremity.

5. A countersink as set forth in claim 1 wherein:
   said flute forms substantially 30 percent of the cross section of said leading extremity along the length thereof.

6. A countersink as set forth in claim 1 wherein:
   said flute is conically shaped with its apex coinciding with the apex of said leading extremity.

7. A countersink as set forth in claim 1 wherein:
   said flute is conically shaped and increases in transverse cross section along the length of said leading edge from the apex thereof in direct proportion to the increase in transverse cross section of said leading extremity to thereby maintain a substantially constant ratio of flute to leading extremity in transverse cross section.

8. A countersink as set forth in claim 7 wherein:
   the cross section of said flute forms at least 25 percent of the cross section of said leading extremity along the length of said leading extremity.

* * * * *